![United States Patent Office]

2,994,685
Patented Aug. 1, 1961

2,994,685
EPOXY RESIN COMPOSITIONS AND METHOD
John Delmonte, Glendale, and William J. Dewar, Canoga Park, Calif., assignors to Furane Plastics Inc., Los Angeles, Calif., a corporation of California
No Drawing. Filed Oct. 8, 1957, Ser. No. 688,839
13 Claims. (Cl. 260—47)

This invention relates to epoxy resin compositions which are valuable compositions for use in the manufacture of varnishes, molding resins, adhesives, films, fibers, etc. The present invention includes new compositions and a method for preparing the same.

The epoxy resins, commercially available as uncured intermediate resins or partial polymers (polyethers of low molecular weight having terminal epoxy groups) under the trade names "Araldite" (Ciba), "Epon" (Shell), etc. in the form of viscous liquids or low melting solid polymers, are not thermosetting as such, but can be converted to the infusible state by crosslinking with the aid of hardeners or curing agents. Conventional curing agents include the polyamines, such as monoethanolamine, diethylene triamine, triethylene tetramine, tetraethylene pentamine, certain polyamides (such as "Versamid" 115 and 125), trimethylene diamine, dimethyl and diethylaminopropylamine, mono and tridimethyl amino methyl phenol, which will cure and react at room, or slightly elevated, temperatures (20–50° C.) to convert the epoxy partial polymers to an infusible, insoluble polymer with useful electrical, mechanical and chemical properties. However, they all possess notable limitations such as sensitivity to moisture and a rapid reaction time—generally less than 60 minutes at room temperature. This rapid reaction time, or so-called short "pot life" is a serious limitation to the usefulness of the mixtures in producing finished products, and the sensitivity to moisture seriously limits the practical applications of the finished resins.

An important object of the present invention is, therefore, to provide novel epoxy resin compositions which are not subject to the above and other disadvantages inherent in those heretofore produced.

Another object of this invention is to provide epoxy resin compositions containing novel curing agents, the compositions having pot lives of 5 to 10 hours at room temperature, and excellent resistance to moisture. A further object is to provide such novel compositions which do not require long curing times and which will convert quite rapidly to cured products once the reaction is initiated.

Other objects and advantages of the invention it is believed will be readily apparent from the following detailed description of preferred embodiments thereof.

Briefly, this invention comprehends within its scope the discovery that epoxy resin compositions of enhanced pot life and moisture sensitivity, and capable of producing industrial products equal or superior to those produced from conventional epoxy resin compositions, are obtained by utilizing an amino glyoxalidine compound or the reaction product of a polyamine and a higher carboxylic acid as the curing agent. It has been further discovered that the curing rate of these compositions is effectively controlled by the inclusion therein of minor proportions of the conventional epoxy curing agents, such as the polyamines and the like referred to above.

The uncured epoxy partial polymers may be defined as a complex epoxide resin comprising a polyether derivative of a polyhydric organic compound, e.g., a polyhydric alcohol or phenol containing epoxy groups, and are disclosed in various places in the art. Among such references may be mentioned Castan Patent No. 2,324,483, Castan Patent No. 2,444,333, British Patents 518,057 and 579,698 and U.S. Patent 2,569,920. For the most part, these epoxy resins are based on the resinous product of reaction between an epihalogenohydrin, for instance epichlorohydrin, and a phenol having at least two phenolic hydroxy groups, for example, 2,2'-bis(para-hydroxyphenyl propane). U.S. Patents 2,494,295, 2,500,600 and 2,511,913 also describe examples of epoxy resins which may be employed in the practice of the present invention. An excellent description of these resins is found in the book entitled "Polymeric Processes," chapter X, "Epoxy Resins," by Salvatore S. Stivola. By reference, all of the aforementioned patents and the publication are intended to be part of the present description of the epoxy resins used in the compositions of the present invention and for brevity, the epoxy resins will not be further described herein other than that they contain more than one ethylene oxide group, e.g., from 1 to 2 or more epoxide groups, per molecule, and may be prepared by effecting reaction between a polyhydric alcohol or phenols, for example hydroquinone, resorcinol, glycerine, and condensation products of phenols with ketones, for instance, 2,2'-bis-(parahydroxyphenyl propane), commonly known as bisphenol A, with epichlorohydrin, and modifications with reactive diluents, such as allylglycidyl ether, phenyl glycidyl ether, butyl glycidyl ether, styrene oxide, etc. For example, the reaction of epichlorohydrin with bisphenol A may be formulated as follows:

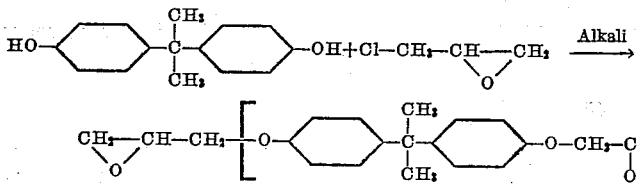

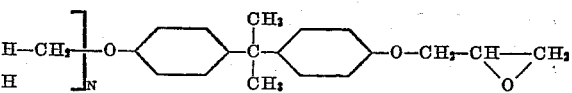

where N has an average value varying from around zero to about 7.

Preferred partial epoxy polymers include Epon 828, Araldite 6010, and Bakelite ERL 2774.

The curing agents of the present invention include amino glyoxalidine or imidazoline compounds which may be prepared, for instance, by reacting a polyamine with a higher carboxylic acid at an elevated temperature of about 120° C., and preferably 225°–300° C. These compounds, which are fully compatible with epoxy resins, immiscible in water and low in skin irritation, may be represented by the formula:

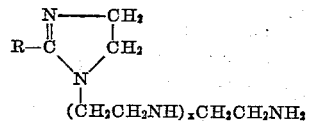

(CH₂CH₂NH)ₓCH₂CH₂NH₂ where R is a higher aliphatic hydrocarbon radical (at least about 6 carbon atoms) and X may be zero or a positive integer.

The polyamines which may be used to prepare the glyoxalidines include: ethylene diamine, diethylene triamine, triethylene tetramine, tetraethylene pentamine, tetramethyl methylene diamine, propylene diamine, dipropylene triamine, tripropylene tetramine, N-n-dodecyl diethylene triamine, N-octyl ethylene diamine, and the like.

Acids which are reacted with the above polyamines to form the glyoxalidines may include: capric, nonanoic, hendecanoic, lauric, n-tridecanoic, myristic, pentadecanoic, palmitic, magaric, stearic, arachidic, behenic, heneicosoic, chuytinic, lignoceric, pentacosic, cerotic, montanic, palmitoleic, oleic, galodeic, cetoleic, myristoleic, lanopalmic, hydroxy stearic, dihydroxy stearic, viconoleic acids, linoleic, elaidic, linolenic, clupanodanic acids and the like. In addition, fatty acids obtained from animal, vegetable and fish oils can be used and the fatty acids derived from the following fixed fatty oils are particularly preferred: cocoanut oil, palm kernal oil, rape oil, linseed oil, soya bean oil, sunflower oil, perilla oil, tung oil, whole oil, cod and cod liver oil, marine animal oil, various fish oils such as herring oil, sardine oil and the like.

Specific glyoxalidines which may be used in compositions of this invention include:

1-amino ethyl 2-heptadecenyl glyoxalidine
1-amino ethyl 2-heptadecyl glyoxalidine
1-amino ethyl 2-undecyl glyoxalidine
1-amino isopropyl 2-heptadecenyl-5-methyl glyoxalidine
1-amino isopropyl 2-heptadecyl-5-methyl glyoxalidine It has been found that the use of the pure glyoxalidine compounds is not essential in the present invention. Thus, it has been found that excellent curing agents comprise the reaction products of the reaction between (1) a primary or secondary polyamine having an active hydrogen atom and (2) a higher carboxylic acid as disclosed above, the reaction being carried out to such an extent as to remove one, and preferably two, molecules of water. The reaction is carried out with equi-molar proportions or with a slight excess of the amine. The reaction is carried out at elevated temperatures, as indicated above, or at room temperatures in the presence of a solvent, all traces of free amine being removed by vacuum distillation. While the reaction, when not carried out to full completion for the production of the pure glyoxalidine, is not fully understood, there is evidence that the polyamide forms first, followed by the glyoxalidine ring formation, the reaction products including unknown compounds in addition to the amino glyoxalidine compound. It is therefore to be understood that the term "an amino glyoxalidine" as used in the claims herein is intended to mean such reaction products, as well as the pure amino glyoxalidine compounds.

The proportions of epoxy resin and amino glyoxalidine curing agent which may be employed may be varied within wide limits, the two ingredients being miscible in all proportions. Thus, based on the total weight of the epoxy resin and the glyoxalidine, the latter may comprise from about 5 to 90 percent. Generally, amounts of glyoxalidine ranging, for instance, from about 10 to 75 percent are advantageously employed with the epoxy resins. Wide variation in physical properties of the finished product are obtained by varying the relative proportions of the ingredients, as will be apparent to those skilled in the art.

Although the mixture of the epoxy resin and the amino glyoxalidine compound is self-curing at room temperature, the curing being accelerated at elevated temperatures, it has been found that great acceleration of the curing rate is obtained by the inclusion of minor amounts (from traces to slightly less than stoichiometric quantities) of one or more of the polyamine curing agents generally known in the art, such as those referred to hereinabove, and which function as cure promoters in the compositions of the present invention.

The following table sets forth specific examples of the compositions of this invention, in each case the ingredients being simply mixed together, it being understood that these examples are only illustrative and it is not intended to limit the invention thereto:

| Example No. | Epoxy | Resin Curing Agt. (Parts by Weight) | Promoter | Pot Life at 25° C., hrs. | Shore D Hardness (Instantaneous and 10 seconds) |
|---|---|---|---|---|---|
| 1 | 100 | 160 | 0 | 8-10 | Soft semi-solid. |
| 2 | 100 | 180 | 0 | 8-10 | Do. |
| 3 | 100 | 200 | 0 | 8-10 | Do. |
| 4 | 100 | 40 | 1.2 | 6 | 86/83. |
| 5 | 100 | 60 | 1.8 | 5½ | 84/82. |
| 6 | 100 | 80 | 2.4 | 5 | 81/76. |
| 7 | 100 | 100 | 3.0 | 4 | 74/65. |
| 8 | 100 | 60 | 0.6 | 8-10 | 83/70. |
| 9 | 100 | 80 | 0.8 | 6-8 | 79/75. |
| 10 | 100 | 100 | 1.00 | 5-7 | 74/64. |
| 11 | 100 | 120 | 1.20 | 4-5 | 59/31. |

The epoxy resin used in the above examples was Araldite 6010, the curing agent comprising 1-(2-aminoethyl)-2-heptadecenyl-2 glyoxalidine and the promoter was tri-dimethyl amino methyl phenol.

In using the compositions they are simply heated for a length of time and at a temperature sufficient to effect curing of the mixture, and this, of course, contemplates room temperatures as well as elevated temperatures. Thus, samples of the composition of Example 5 were fully cured (as measured by acetone resistance and full hardness) under the following conditions:

Temperature:                            Cure time
    25° C. _____hours__ 24
    150° F. _____do____  4
    100° C. _____do____  1
    150° C. _____minutes__ 5

The chemical resistance of the cured products, as measured by change in weight upon immersion in hot water, hot alkalies and hot acids, is much superior to conventionally-cured epoxy resins of equivalent hardness. The fact that full cure is obtained in 24 to 48 hours at room temperature, yet with a pot life much longer than has heretofore been possible, is believed to represent a remarkable advance in the epoxy resin art.

Having fully described our invention, it is to be understood that we do not wish to be limited to the details set forth, but our invention is of the full scope of the appended claims.

We claim:
1. An epoxy resin composition comprising a glycidyl polyether of a polyhydric organic compound in which the polyhydric organic compound is selected from the class consisting of polyhydric alcohols and polyhydric phenols, and a curing agent comprising an amino glyoxalidine compound of the formula:

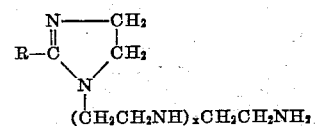

where R is an aliphatic hydrocarbon radical having at least about 6 carbon atoms and where X is selected from the group consisting of 0 and a positive integer.

2. An epoxy resin composition comprising a glycidyl polyether of a polyhydric organic compound in which the polyhydric organic compound is selected from the class consisting of polyhydric alcohols and polyhydric phenols, a curing agent comprising an amino glyoxalidine compound of the formula:

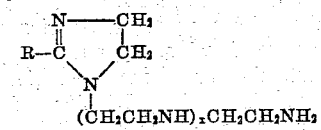

where R is an aliphatic hydrocarbon radical having at least about 6 carbon atoms and where X is selected from the group consisting of zero and a positive integer, and a minor effective proportion of an amine promoter.

3. An epoxy resin composition comprising a glycidyl polyether of a polyhydric organic compound in which the polyhydric organic compound is selected from the class consisting of polyhydric alcohols and polyhydric phenols, a curing agent comprising an amino glyoxalidine compound of the formula:

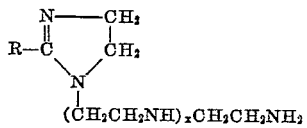

(CH₂CH₂NH)ₓCH₂CH₂NH₂ where R is an aliphatic hydrocarbon radical having at least about 6 carbon atoms and where X is selected from the group consisting of zero and a positive integer, and a minor effective proportion of a promoter comprising tridimethyl amino methyl phenol.

4. An epoxy resin composition comprising a glycidyl polyether of a polyhydric organic compound in which the polyhydric organic compound is selected from the class consisting of polyhydric alcohols and polyhydric phenols, and a curing agent comprising 1-(2-aminoethyl)-2-heptadecenyl-2 glyoxalidine.

5. An epoxy resin composition comprising a glycidyl polyether of a polyhydric organic compound in which the polyhydric organic compound is selected from the class consisting of polyhydric alcohols and polyhydric phenols, a curing agent comprising 1-(2-aminoethyl)-2-heptadecenyl-2 glyoxalidine, and a minor effective proportion of tridimethyl amino methyl phenol.

6. The composition of claims 1 wherein the glycidyl polyether is prepared by reacting 2,2'-bis-(parahydroxphenyl propane) and epichlorohydrin.

7. The process which comprises forming a mixture of the ingredients of claim 1, and heating said mixture for a time and at a temperature sufficient to effect curing of said mixture.

8. The process which comprises forming a mixture of the ingredients of claim 2, and heating said mixture for a time and at a temperature sufficient to effect curing of said mixture.

9. The process which comprises forming a mixture of the ingredients of claim 3, and heating said mixture for a time and at a temperature sufficient to effect curing of said mixture.

10. The composition from claim 1 wherein the curing agent comprises of about 5 to 90% by weight of the composition.

11. The composition of claim 2 wherein the curing agent comprises from about 5 to 90% by weight of the composition.

12. The composition of claim 3 wherein the curing agent comprises from about 5 to 90% by weight of the composition.

13. The process which comprises forming a mixture of ingredients comprising a glycidyl polyether of a polyhydric organic compound in which the polyhydric organic compound is selected from the class consisting of polyhydric alcohols and polyhydric phenols, from about 5 to 90% by weight of 1-(2-aminoethyl)-2-heptadecenyl-2 glyoxalidine and a minor effective proportion of trimethyl amino methyl phenol, and heating said mixture for a time and at a temperature sufficient to effect curing of said mixture.

References Cited in the file of this patent

UNITED STATES PATENTS

| | | |
|---|---|---|
| 2,760,944 | Greenlee | Aug. 28, 1956 |
| 2,771,434 | De Groote et al. | Nov. 20, 1956 |
| 2,878,233 | Harrison | Mar. 17, 1959 |
| 2,878,234 | Peterson | Mar. 17, 1959 |

OTHER REFERENCES

Schildknecht: Polymer Processes, vol. 10, page 441 published by Interscience, N.Y. (1956).